(12) United States Patent
Röhrl et al.

(10) Patent No.: US 10,043,334 B2
(45) Date of Patent: Aug. 7, 2018

(54) SENSOR FOR CHECKING VALUE DOCUMENTS

(75) Inventors: Wolfgang Röhrl, Riemerling (DE);
Franz Müller, München (AT); Helmut Steidl, München (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 13/822,063

(22) PCT Filed: Sep. 19, 2011

(86) PCT No.: PCT/EP2011/004671
§ 371 (c)(1),
(2), (4) Date: May 22, 2013

(87) PCT Pub. No.: WO2012/038052
PCT Pub. Date: Mar. 29, 2012

(65) Prior Publication Data
US 2014/0147030 A1    May 29, 2014

(30) Foreign Application Priority Data

Sep. 20, 2010 (DE) .......................... 10 2010 046 024

(51) Int. Cl.
*G07D 7/00* (2016.01)
*G07D 11/00* (2006.01)
(Continued)

(52) U.S. Cl.
CPC ................. *G07D 7/20* (2013.01); *G06F 8/65* (2013.01); *G06F 9/4401* (2013.01); *G07D 7/00* (2013.01); *G07D 11/0078* (2013.01)

(58) Field of Classification Search
CPC ........ G07D 11/0078; G07D 7/00; G07D 7/20; G06F 8/65; G06F 9/4401
See application file for complete search history.

(56) References Cited

U.S. PATENT DOCUMENTS 5,909,502 A * 6/1999 Mazur ........................... 382/135
6,039,645 A * 3/2000 Mazur ............................. 453/10
(Continued)

FOREIGN PATENT DOCUMENTS

DE    40 28 762 A1    3/1992
DE    100 37 177 A1    2/2002
(Continued)

OTHER PUBLICATIONS

International Search Report in PCT/EP2011/004671, dated Apr. 3, 2013.
(Continued)

*Primary Examiner* — Katrina Fujita
(74) *Attorney, Agent, or Firm* — Justin J. Cassell; Workman Nydegger (57) ABSTRACT

A sensor for checking value documents, an apparatus with the sensor, and a method for operating the sensor. Neither the software that the sensor executes for checking the value documents nor the adaptation data that the sensor employs for checking the value documents are stored permanently in the sensor itself. The sensor is set up for the software as well as the adaptation data to be loaded into the sensor from outside the sensor. The sensor can be employed for checking value documents only when a data carrier is connected to the sensor, and the data carrier has license data stored thereon through which a license for the employment of the software and/or of the adaptation data is supplied to the sensor.

25 Claims, 2 Drawing Sheets

(51) Int. Cl.
*G07D 7/20* (2016.01)
*G06F 8/65* (2018.01)
*G06F 9/4401* (2018.01)

(56) References Cited

U.S. PATENT DOCUMENTS

| | | | | |
|---|---|---|---|---|
| 6,131,718 | A * | 10/2000 | Witschorik | 194/206 |
| 6,272,245 | B1 * | 8/2001 | Lin | 382/195 |
| 6,318,536 | B1 * | 11/2001 | Korman et al. | 194/217 |
| 7,104,383 | B1 * | 9/2006 | Saltsov et al. | 194/206 |
| 7,104,441 | B2 * | 9/2006 | Shepley | G07F 19/20 235/379 |
| 7,367,492 | B2 * | 5/2008 | Shepley | G07F 19/20 235/379 |
| 7,513,413 | B2 * | 4/2009 | Graef | B65H 29/06 235/379 |
| 7,699,153 | B2 * | 4/2010 | Ehrich et al. | 194/206 |
| 7,721,953 | B1 * | 5/2010 | Shepley | G06Q 20/1085 235/379 |
| 7,866,545 | B2 * | 1/2011 | Rapf et al. | 235/379 |
| 7,929,749 | B1 * | 4/2011 | Jones et al. | 382/135 |
| 8,139,839 | B2 * | 3/2012 | Giering et al. | 382/137 |
| 8,212,205 | B2 * | 7/2012 | Giering et al. | 250/271 |
| 8,837,804 | B2 * | 9/2014 | Su et al. | 382/135 |
| 2002/0026422 | A1 * | 2/2002 | Kersten | G06F 8/65 705/45 |
| 2007/0119681 | A1 * | 5/2007 | Blake et al. | 194/215 |
| 2007/0135216 | A1 * | 6/2007 | Martinek | G07F 17/32 463/29 |
| 2011/0199649 | A1 * | 8/2011 | Steidl | 358/406 |
| 2012/0216726 | A1 * | 8/2012 | Seibert | G07F 19/20 109/23 |
| 2014/0107836 | A1 * | 4/2014 | Crews | G07F 19/206 700/236 |

FOREIGN PATENT DOCUMENTS

| | | |
|---|---|---|
| DE | 102 42 572 A1 | 4/2004 |
| DE | 10 2008 061 982 A1 | 6/2010 |
| EP | 1 043 699 A1 | 10/2000 |
| EP | 1 223 563 A2 | 7/2002 |
| EP | 2 088 564 A1 | 8/2009 |
| WO | 01/59716 A1 | 8/2001 |

OTHER PUBLICATIONS

Search Report in German Patent Application No. 10 2010 046 024.9, dated Jun. 7, 2011.
International Preliminary Report on Patentability and Written Opinion in PCT/EP2011/004671, dated Jun. 12, 2013.

* cited by examiner

SENSOR FOR CHECKING VALUE DOCUMENTS

BACKGROUND OF THE INVENTION

A. Field of the Invention

This invention relates to a sensor for checking value documents, to an apparatus for checking value documents which has the sensor, and to a method for operating the sensor.

B. Related Art

For checking value documents it is usual to employ sensors with which the type of the value documents is determined and/or with which the value documents are checked for authenticity and/or for their state. Such sensors are employed e.g. for checking bank notes, checks, identity cards, credit cards, check cards, tickets, vouchers and the like. The value documents are checked in an apparatus for value-document processing which contains one or several different sensors, depending on the value-document properties to be checked.

For checking the value documents, such sensors usually require adaptation data, i.e. data about the value documents to be checked, which the sensor accesses for checking the value documents. These can be e.g. comparison data with which the measuring data of the value documents are compared, or also criteria according to which the authenticity, the type or the state of the value documents is assessed.

Even after being put into operation, such sensors are kept up to date, in particular with regard to the software for operating the sensors and with regard to the adaptation data required for checking new value documents. Hence, the sensors usually from time to time receive updates relating to their software or updates relating to the adaptation data required for checking the value documents or also updates relating to data of newly discovered forged value documents. Hitherto such updating has required a service call at the site of the sensor to make the update with the new software or the new data available to the sensor. For this purpose the updates have been for example transferred to the sensor from a portable computer, by a person authorized by the sensor manufacturer, and permanently stored in a non-volatile memory of the sensor. However, such service calls can involve a relatively long waiting time for the sensor operator and high costs. In the event that a sensor that is in operation is to be replaced by a new sensor, e.g. because of a technical defect, it is necessary to equip the new sensor with the same software and the same adaptation data as the defective sensor has. The transfer of the software and of the adaptation data to the new sensor has hitherto also required such a service call.

An object of the present invention is to state a sensor for checking value documents that can be replaced by a new sensor with little effort.

SUMMARY OF THE DISCLOSURE

The sensor configured for checking the value documents has a non-volatile memory which is permanently installed in the sensor, a measuring device for collecting measuring data of the value documents to be checked, a processor for controlling the sensor and for evaluating the measuring data, a data-carrier receiving means via which a data carrier is physically and electronically connectable to the sensor, and a volatile memory in which software and adaptation data for checking the value documents can be stored temporarily. The volatile memory can be a constituent of the processor of the sensor or be connected to the processor of the sensor via a data bus. The sensor is set up to execute the software stored temporarily in the volatile memory in order to collect measuring data of the value documents through the measuring device and in order to check the value documents on the basis of the collected measuring data and using the adaptation data stored temporarily in the volatile memory.

Adaptation data for checking the value documents refers to those data that the sensor requires for checking the value documents to be able to assess the authenticity, the type or the state of the value documents. The measuring data collected by the sensor are evaluated using the adaptation data. Adaptation data usually contain individual criteria for checking the value documents, which are different for the different types of value documents. For example, it is necessary in the case of newly emitted bank notes to make available to the sensor the criteria for ascertaining the type and for assessing the authenticity of these new bank notes. Software for checking the value documents refers to one or several programs that the sensor executes in order to carry out the steps necessary for checking the value documents, e.g. in order to collect measuring data, process them and evaluate them.

The sensor is characterized in that neither the software that the sensor executes for checking the value documents, nor the adaptation data that the sensor employs for checking the value documents, are stored permanently in the sensor, and that they are not stored permanently in the sensor for operating the sensor either. A storage is understood here to be permanent when it extends at least over a time period as is required for carrying out the checking of value documents, e.g. of an individual value document or of a stack of value documents inserted in an apparatus for value-document processing. In contrast, the sensor is set up for the software as well as the adaptation data to be loaded into the sensor from outside the sensor, and temporarily stored in a volatile memory of the sensor. The sensor does have a non-volatile memory containing firmware of the sensor, but this non-volatile memory does not store any software or any adaptation data. The adaptation data loaded into the sensor and the software loaded into the sensor are stored neither in this non-volatile memory of the sensor nor in another non-volatile memory of the sensor. The software and the adaptation data are made available to the sensor in the first embodiment example through a data carrier which is connected to the sensor via the data-carrier receiving means, and in the second embodiment example through a memory area of a computer with which the sensor can exchange data.

In particular, it is specified in the firmware of the sensor, in particular through a basic operating system of the sensor contained in the firmware, that the software as well as the adaptation data are loaded into the sensor from outside the sensor, and stored in a volatile memory of the sensor. It is provided here that the software and the adaptation data are only loaded into the sensor when the sensor is to be operated for checking the value documents. The sensor is configured to subsequently execute the software stored in the volatile memory, and to check the authenticity and/or the type and/or the state of the value documents on the basis of the adaptation data stored in the volatile memory.

It can be provided that the sensor can be employed for checking value documents only when a data carrier is connected to the sensor via the data-carrier receiving means.

Said means ensures that only those sensors for which a suitable data carrier is available can actually be employed for checking value documents. The data carrier is connectable to the sensor electronically such that data can be exchanged between the data carrier and the sensor. Preferably, the data carrier is configured as a flash card, e.g. as an SD card or MMC card, and equipped with a PC-compatible file system. A data carrier configured as a flash card has the advantage that it is portable and favorably priced and can be connected to the sensor via a standard slot without the sensor having to be opened.

In particular, it is provided that the data carrier has license data stored thereon through which a license is supplied for the employment of the software and/or of the adaptation data, or for the employment of constituents thereof. Through this license the employment of the software and/or adaptation data or constituents thereof is enabled for the sensor. Preferably, the sensor is set up to check, before the loading of the software and/or of the adaptation data into the volatile memory, for which software and/or for which adaptation data a data carrier connected to the data-carrier receiving means supplies a valid license. In the sensor itself there has been, and is, stored no information about for which software and/or adaptation data a valid license is present. In an apparatus for accepting and/or dispensing value documents in which the sensor has been installed, or is installed, there likewise has been, and is, stored no information about for which software and/or adaptation data a valid license is present.

The storage of the software and adaptation data and, where applicable, of the license data, outside the sensor, instead of a storage in the sensor itself, is advantageous e.g. when a sensor that is in operation is to be replaced by a new sensor, e.g. because of a technical defect. For in this case the total compilation of software and adaptation data and, where applicable, license data of the sensor which is to be employed for the respective sensor can be transferred very simply to the new sensor. For the sensor manufacturer there further results the advantage that the sensors themselves need not be individually equipped with software and adaptation data. Because no use is made in the sensor of a non-volatile memory for the permanent storage of software and adaptation data, the sensor can be manufactured more cost-efficiently and have a space-saving design. The storage of the software and adaptation data outside the sensor, instead of a storage in the sensor itself, moreover increases the flexibility of the storage volume and hence makes it possible for the sensor also to be operated with very extensive software and memory-intensive adaptation data, if needed.

The non-volatile memory is a permanent constituent of the sensor in which firmware of the sensor is contained. This firmware comprises e.g. an invariable basic operating system of the sensor which is required for starting up the software. In the non-volatile memory of the sensor there is stored e.g. substantially the basic operating system of the sensor. The basic operating system can, however, alternatively also be stored on the data carrier to be connected to the sensor, which in this case is configured as a bootable data carrier, e.g. as a bootable flash card. In the non-volatile memory there can be stored, besides the basic operating system of the sensor, also calibrating data of the sensor. The calibrating data are usually fitted individually to the sensor and are set off against the collected measuring data of the sensor to adjust the measuring data of different sensors to each other. The non-volatile memory can be configured e.g. as a flash memory or as a ROM, EPROM or EEPROM.

Because the storage capacity of the non-volatile memory does not need to be designed for storing software and adaptation data, a favorably priced non-volatile memory with relatively low storage capacity can advantageously be employed for the sensor.

Preferably, the sensor is equipped with a communication interface via which data can be loaded into the sensor. Via the communication interface the sensor can e.g. receive data and/or control commands from an apparatus for accepting and/or dispensing value documents or send them thereto.

In a first embodiment example, the adaptation data and/or the software is made available to the sensor by a data carrier connected to the data-carrier receiving means. In this embodiment example, the sensor, in particular the sensor firmware contained in the non-volatile memory, is set up to load the adaptation data and/or the software from the data carrier connected to the data-carrier receiving means into the sensor, and to store it in the volatile memory of the sensor.

In a second embodiment example, the sensor, in particular the sensor firmware contained in the non-volatile memory, is set up to load the adaptation data and/or the software via the communication interface of the sensor directly into the sensor, and to store it in the volatile memory of the sensor. The adaptation data and/or the software is made available e.g. by a computer outside the sensor and loaded from there into the volatile memory of the sensor via the communication interface.

The invention also relates to an apparatus for checking value documents which has the above-described sensor and a data carrier which is connectable or connected to the sensor via the data-carrier receiving means. The data carrier has license data stored thereon through which it is determined for which software and/or for which adaptation data the data carrier supplies a license. Moreover, the data carrier can also have stored thereon adaptation data and/or software for checking the value documents. The apparatus can be an apparatus for processing value documents which is configured for accepting and/or dispensing value documents. The apparatus can also be a set comprising the sensor and the data carrier, e.g. a set that is to be installed in an apparatus for value-document processing.

The invention relates further to a method for operating the above-described sensor configured for checking value documents. For operating the sensor the following steps are carried out:

a) A data carrier is connected to the sensor via the data-carrier receiving means.

b) Subsequently, adaptation data for checking the value documents and software for checking the value documents are loaded into the sensor from outside the sensor and stored temporarily in the volatile memory of the sensor. In so doing, neither the adaptation data loaded into the sensor nor the software loaded into the sensor is stored permanently in the sensor, i.e. said data and software are not stored either in the non-volatile memory of the sensor or in another non-volatile memory of the sensor.

After the steps a) and b), the software stored in the volatile memory is executed. Upon the executing of the software, measuring data are collected from the value documents by the measuring device, and the value documents are checked, in particular for their authenticity and/or their type and/or their state, on the basis of the collected measuring data and using the adaptation data loaded into the volatile memory.

The data carrier which is connected to the sensor in the step a) has license data stored thereon through which it is determined for which software and/or adaptation data the respective data carrier supplies a license. The information about for which software and/or adaptation data the respective data carrier supplies a license is determined here exclusively by the license data stored on the data carrier. The license data contain information about for which constituents of the software and/or of the adaptation data the respective data carrier supplies a license and thus which constituents of the software and/or adaptation data may be utilized in connection with this data carrier. The license data can contain information about in which time period the respective data carrier supplies a valid license for the software and/or the adaptation data and/or their constituents.

The license data supply a valid license only in connection with one or several certain data carriers. To obtain this, there is employed a data carrier having a worldwide individual identifier which is stored unchangeably on the data carrier. The license supplied by the data carrier is coupled to the individual identifier of the data carrier such that the licenses contained in the license data are valid exclusively in connection with this one or several certain data carriers. Hence, the respective adaptation data and/or software is employable only when the sensor is connected to a certain data carrier having license data stored thereon that correspond with the individual identifier of the data carrier. In connection with an arbitrary data carrier having another individual identifier that does not correspond with the license data, these license data do not supply a valid license.

Before the loading of the software and adaptation data into the volatile memory according to step b) it is checked on the basis of the license data stored on the data carrier for which software and adaptation data the data carrier supplies a valid license. Only that software and those adaptation data for which the data carrier supplies a valid license according to the license data are loaded into the sensor from outside the sensor and stored in the non-volatile memory of the sensor. To ascertain for which software and adaptation data the data carrier supplies a valid license, it is checked whether the individual identifier stored unchangeably on the data carrier corresponds with the license data. In particular, it can, in so doing, be checked whether the individual identifier of the data carrier corresponds with an identifier contained in the license data, e.g. whether they match or whether they yield a certain result when combined with each other. Alternatively or additionally, it can, in so doing, also be checked whether the individual identifier of the data carrier matches an identifier to which the license data refer. Such referring can be realized e.g. by the data carrier having a group information item stored thereon which contains an association of the respective data carrier with a group of data carriers, in connection with license data that are valid for a group of data carriers, i.e. that are configured as a group license. The described method steps can be specified in the basic operating system of the sensor.

If the license data also contain limited-time licenses, it is checked e.g. whether the present time falls within the respective period of validity of the limited-time license. To be able to check the validity of a limited-time license, the sensor can be equipped with a real-time clock. Alternatively, the sensor can also check the validity of the limited-time license without any information about the actual time. For example, the sensor checks for this purpose whether the date of the software and/or of the adaptation data falls within the period of validity defined by the license data.

The license data are safeguarded against falsification by a digital signature. For decrypting the digital signature there can be employed a public key which is stored in the non-volatile memory of the sensor. The sensor checks the digital signature of the license data to ensure that the license data originate with the sensor manufacturer. The software and/or adaptation data can also be safeguarded by a digital signature, and the key for decrypting the software and/or the adaptation data be stored in the non-volatile memory of the sensor. Preferably, the sensor checks the authenticity and integrity of the software and adaptation data to be loaded, before it employs the software and adaptation data for checking the value documents.

In hitherto known sensors, the license for employing the software and/or adaptation data was coupled to the serial number of the sensor and, hence, a service call was always necessary for transferring the licenses from the defective to the new sensor. In comparison, the relocation of the license data to the data carrier and the coupling of the license to the individual identifier of the data carrier simplify the handling of the licenses considerably. For even when a sensor becomes defective, the sensor operator remains in possession of his licenses once acquired. He can transfer the licenses to a new sensor simply by removing the data carrier with the license data stored thereon from the defective sensor and connecting it to the new sensor.

The licensing method additionally results in the following advantages:

Because the respective license data are employable only in connection with the data carrier for which these license data were generated, it is not possible to generate a second valid license by copying the license data onto an arbitrary second data carrier. Hence, the license data can also be sent over the Internet in a simple manner, e.g. by email.

The software and/or adaptation data are identical for all sensors, regardless of the licenses that the respective sensor operator has acquired. This reduces, for the sensor manufacturer, the effort relating to the creation and documentation of the different compilations of software data and adaptation data which would be required for the respective sensors of the different sensor operators.

Through the relocation of the license data from the sensor to the data carrier, the sensors can be kept up to date in a simple manner, and their functions be subsequently extended as needed.

In the first embodiment example, the adaptation data and/or the software is made available by the data carrier attached to the data-carrier receiving means. For loading the adaptation data and the software from outside the sensor according to step b), the adaptation data and/or the software is loaded into the sensor by the data carrier, and stored in the volatile memory of the sensor. In dependence on for which software and adaptation data the data carrier supplies a valid license, there is then loaded from the data carrier into the sensor only that software and/or those adaptation data for which the data carrier supplies a valid license. In the first embodiment example, the adaptation data as well as the software are loaded from the data carrier into the sensor. Alternatively, however, only one of the two components, adaptation data and software, can be loaded from the data carrier into the sensor. The respective other component can be loaded into the sensor e.g. via the communication interface of the sensor. For example, the adaptation data can be loaded into the sensor from the data carrier, and the software via the communication interface. Alternatively, however, the software can also be loaded into the sensor from the data carrier, and the adaptation data via the communication interface.

In the second embodiment example, the adaptation data and the software are made available by a computer which can communicate with the sensor via the communication interface of the sensor. For loading the adaptation data and software from outside the sensor according to step b), the adaptation data as well as the software are loaded into the sensor via the communication interface of the sensor, and stored directly in the volatile memory of the sensor. The adaptation data and/or software is preferably supplied by the computer of an apparatus in which the sensor is installed, in particular by an apparatus for accepting and/or dispensing value documents. In dependence on for which software and adaptation data the data carrier supplies a valid license, however, only that software and/or those adaptation data for which the data carrier supplies a valid license are loaded into the sensor from the memory area of the computer which is connected to the sensor via the communication interface.

DESCRIPTION OF THE DRAWINGS

Hereinafter the invention will be explained by way of example with reference to the following figures. There are shown.

DETAILED DESCRIPTION

Figure 1A:
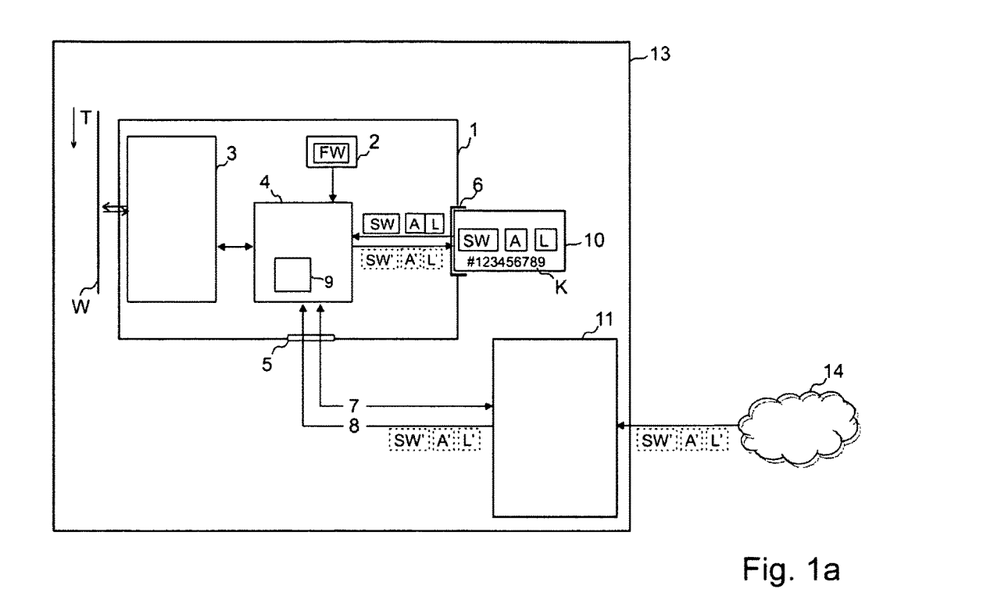
FIG. 1a schematic representation of a sensor with internal functional units of the sensor and its outward interfaces according to a first embodiment example, FIG. 1b schematic representation of a sensor with internal functional units of the sensor and its outward interfaces according to a second embodiment example, FIG. 2a exemplary assemblage of the sensor software employed for checking value documents, FIG. 2b exemplary assemblage of the sensor adaptation data employed for checking the value documents, FIG. 2c exemplary assemblage of license data for use of the software and of the adaptation data by the sensor, FIG. 2d exemplary assemblage of update license data for the sensor, FIG. 2e,f license data for a group of flash cards (FIG. 2e) and a flash card belonging to the group (FIG. 2f).

In FIG. 1a there is shown a sensor 1 for checking value documents according to a first embodiment example. The sensor 1 is intended to be installed in an apparatus 13 for accepting and/or dispensing value documents. The further components of the apparatus 13, such as e.g. the transport system as well as input and output pockets for value documents, value-document stores and input and output interfaces for the operator of the apparatus 13, are omitted in FIG. 1a (as also in FIG. 1b) to simplify the representation. The sensor 1 has a measuring device 3 through which the sensor can collect measuring data of a value document W to be checked. The value document W is transported past the sensor 1 along a transport direction T in order that the measuring device 3 can successively collect measuring data of a multiplicity of measuring points on the value document W. The measuring device 3 can collect measuring data for optical and/or magnetic and/or electrical and/or other properties of the value document. The collected measuring data are transferred to a processor 4 through which the measuring data are processed and evaluated. The processor 4 is equipped with a volatile memory 9 in which software SW and adaptation data A for checking the value documents are stored temporarily. Alternatively, the volatile memory 9 can also be arranged outside the processor 4. The sensor 1 further contains a non-volatile memory 2 which only needs to have a relatively small storage capacity. This memory is employed only for supplying firmware FW of the sensor permanently in the sensor, e.g. a basic operating system of the sensor which is necessary for booting the sensor, or calibrating data which are employed for an adjusting of the collected measuring data and have been determined individually for the measuring device 3 of the sensor. In the non-volatile memory 2, however, no software SW and no adaptation data A for checking the value documents W have been or are stored. The sensor 1 also contains no further non-volatile memory in which the software of the sensor and adaptation data for checking the value documents have been or are permanently stored.

The software SW and adaptation data A required for checking the value documents are made available to the sensor from outside the sensor. In the example of FIG. 1a the software SW and the adaptation data A are stored on a portable data carrier, e.g. on a flash card 10. For checking the value documents this flash card 10 must be connected to the sensor 1 via a data-carrier receiving means 6. The data-carrier receiving means 6 can be configured e.g. as a flash-card slot which is integrated into the housing of the sensor 1. For checking the value documents, the software SW and adaptation data A located on the flash card are loaded into the sensor 1 and stored there in the volatile memory 9. As soon as the software SW and adaptation data A have been loaded from the flash card 10 into the volatile memory 9, the processor 4 can execute the software and carry out the check of the value documents.

The license for using the software SW and the adaptation data A stored on the flash card 10 is determined by license data L which are likewise stored on the flash card 10. Of the software SW and adaptation data A stored on the flash card 10, only that or those can be loaded into the sensor 1 for which a valid license is present according to the license data L. Details on the checking of the license data L will follow in the description for FIGS. 2c and 2d.

The sensor 1 further has a communication interface 5 via which data can be loaded into the sensor 1 from outside the sensor 1. The communication interface 5 can be e.g. a USB or Ethernet interface. Via the communication interface 5 the sensor is connected to a computer 11, e.g. to the computer of an apparatus 13 for accepting and/or dispensing value documents in which the sensor 1 is installed. The computer 11 can be in particular the computer of an automatic teller machine 13, which, like the sensor 1, is housed in the housing of the automatic teller machine 13. However, the computer 11 can also be a central computer which is connected to several automatic teller machines Between the sensor 1 and the computer 11 there is a bidirectional real-time connection 7 via which e.g. control commands or measurement results of the sensor 1 relating e.g. to the authenticity, type or state of the value documents are transferred from or to the computer 11. Furthermore, the sensor 1 is connected to the computer 11 via a data line 8 via which software updates SW' and/or adaptation data updates A' and/or license data updates L' are transferred to the sensor 1. These updates SW', A', L' can be transferred over the Internet 14 to the computer 11 and from there via the data line 8 to the sensor 1. The updates are not stored in the sensor 1, however, but only on the flash card 10 connected to the sensor 1, where they replace or supplement the (previous) software and/or adaptation data and/or license data L. For example, the processor 4 of the sensor 1 ensures the transfer of the update software SW' and/or update adaptation data A' and/or update license data L' directly from the communication interface 5, through the sensor 1, to the flash card 10 connected to the sensor 1. The loading of the update software SW' and/or of the update adaptation data A' via the communication interface 5 of the sensor, through the sensor, onto the data carrier can be carried out in dependence on a check of whether the data carrier 10 supplies a valid license for the updates.

The flash card 10 can already have software SW and/or adaptation data A for checking the value documents stored thereon before the flash card 10 is connected to the sensor 1. The flash card 10 can have e.g. already received the software SW and/or the adaptation data A before their delivery through the sensor manufacturer. However, the flash card 10 can also have been transferred to the sensor 1 from a defective sensor 1' and therefore already contain the software SW and/or adaptation data A. However, it is also possible that, upon the connecting of the flash card 10 to the sensor 1, the flash card 10 does not yet have any software SW and/or any adaptation data A stored thereon. In this case the software SW and/or adaptation data A are stored directly into the inserted flash card 10 via the communication interface 5 of the sensor 1, without being stored in the sensor 1 otherwise.

Figure 1B:
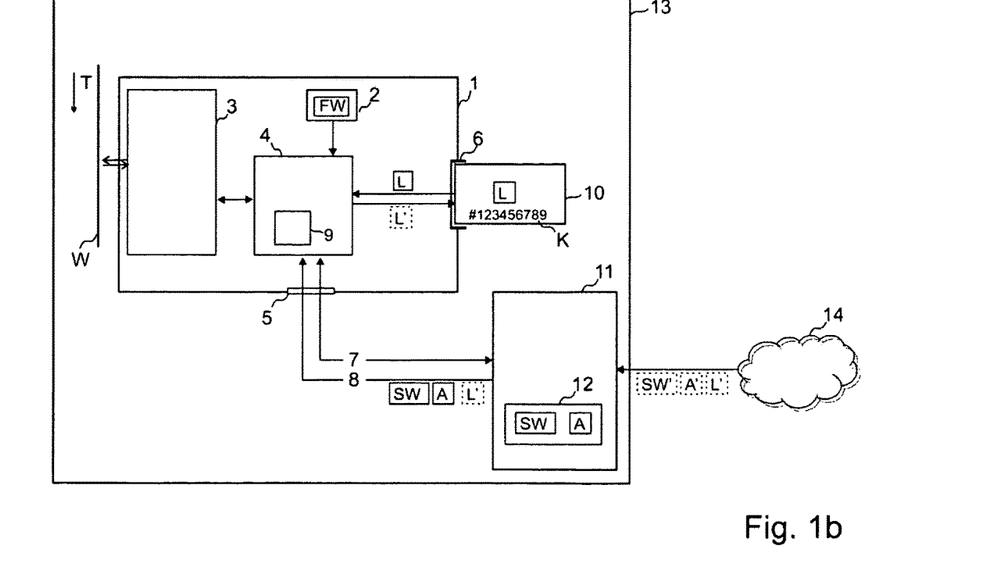

FIG. 1b shows a second embodiment example in which the flash card 10 has stored thereon only license data L, but no software SW and no adaptation data A for checking the value documents W. In contrast to the first embodiment example, the software SW and adaptation data A are, in this example, stored permanently in a memory area 12 of the computer 11 of the apparatus 13. The sensor 1 is connected to the computer 11 via the real-time connection 7 and via the data line 8. Only when it is time to check the value documents does the processor 4 of the sensor 1 ensure that the software SW and adaptation data A are transferred to the sensor 1 from the memory area 12 via the data line 8 and stored in the volatile memory 9 of the sensor 1. As soon as the software SW and adaptation data A from the memory area 12 have been stored into the volatile memory 9 of the sensor 1, the processor 4 can execute the software SW and carry out the check of the value documents. Software SW and/or adaptation data A stored in the memory area 12 of the computer 11 can also be replaced by update software SW' and/or update adaptation data A' which are transferred from the Internet 14 to the computer 11 of the apparatus 13. Any update license data L' are sent, as in the first embodiment example, via the communication interface 5 through the sensor 1 to the flash card 10 connected to the sensor 1, where they replace or supplement the (previous) license data L.

Figure 2A:
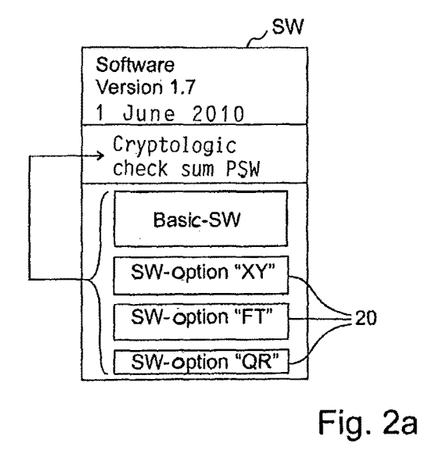

In FIG. 2a there are represented by way of example the constituents of software SW which the sensor 1 can employ for checking the value documents W. This example involves the version 1.7 of the software employable for the sensor 1, which is valid from 1 Jun. 2010 and replaces the previously valid version. Besides basic software which the sensor necessarily requires for checking the value documents, the software includes three software options 20 with the designations "XY", "FT" and "QR" which the sensor operator can optionally acquire for the sensor 1 and can enable for his sensor 1, using a corresponding license. Through these software options 20 the sensor 1 can be given extended functions, e.g. for checking the state of the value documents on the basis of the collected measuring data, for reading the serial numbers of the value documents, for reading checks or for tracking forged value documents.

Figure 2B:
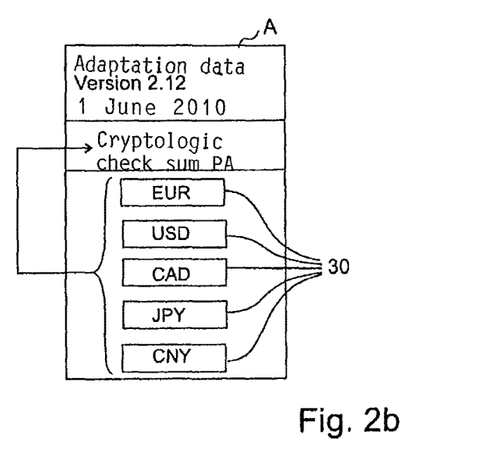

FIG. 2b shows an exemplary assemblage of the adaptation data A for checking the value documents W, which the processor 4 of the sensor 1 accesses upon the executing of the software SW. In this example, the adaptation data A contain five different data sets 30 with the designations "EUR", "USD", "CAD", "JPY" and "CNY" for the currencies euro, US dollar, Canadian dollar, Japanese yen and Chinese yuan. Each of the data sets 30 contains e.g. comparison data for each denomination of the respective currency, with which the collected measuring data of the value documents W are compared. These adaptation data A of the version 2.12 are likewise valid from 1 Jun. 2010 and replace the previously valid adaptation data.

The software SW as well as the adaptation data A are safeguarded against falsification by cryptologic check sums PSW and PA, respectively. In the software SW there is contained for this purpose a cryptologic check sum PSW which is computed from the basic software and the software options 20. Analogously, the cryptologic check sum PA contained in the adaptation data A is computed from the data sets 30 of the adaptation data A. Before the loading of the software SW and of the adaptation data A it is checked by the sensor 1 whether the basic software and the software options 20 yield the check sum PSW and whether the data sets 30 of the adaptation data A yield the check sum PA. Only in the case of a match of the same are the basic software and the software options 20 or the data sets 30 of the adaptation data A loaded into the sensor 1. The check sums PSW and PA as well as the version designation and the date of the software or of the adaptation data are stored in encrypted form in the software SW or in the adaptation data A, and are decrypted before checking of the respective check sum PSW or PA by the sensor 1, which has corresponding keys.

Figure 2C:
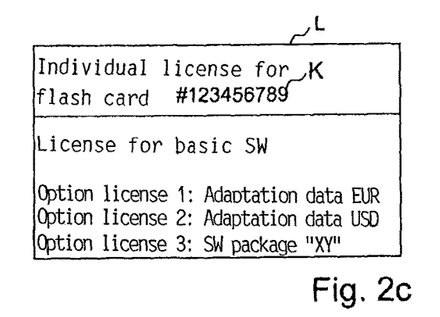

In FIG. 2c there is shown an example of the assemblage of license data L. Through these license data L it is determined for which constituents of the software SW and for which constituents of the adaptation data A a license exists. The license data L contain several single licenses and are compiled individually for the respective sensor 1, in dependence on which constituents of the software SW and of the adaptation data A the sensor operator wishes to utilize. The sensor operator receives the flash card 10 with the selection of single licenses desired by him. The license data L from FIG. 2c comprise a license for the basic software of the sensor 1 and three option licenses: the option licenses 1 and 2 for the data sets EUR and USD of the adaptation data A and the option license 3 for the software option "XY" of the software SW, cf. FIGS. 2a, 2b. The license for the basic software and the option licenses are valid for an unlimited time. The license data L can also be encrypted.

The license data L shown in FIG. 2c are compiled individually for a certain flash card 10 and deliver a valid license only if they are stored on this flash card 10 which has the "right" identifier K. This can be ensured e.g. by employing a flash card 10 which carries an individual identifier K which is unique worldwide and which is stored unchangeably on the flash card 10, cf. FIGS. 1a, 1b. In the example of the flash card 10, this individual identifier K reads "#123456789". Before the loading of the software SW and of the adaptation data A into the sensor 1 it is checked whether the flash card 10 having the identifier K connected to the sensor 1 also contains license data L which are valid for this flash card 10 having the identifier K. If this check yields a positive result, software and adaptation data are loaded into the sensor 1, but only those constituents of the software SW and of the adaptation data A for which the license data L supply a valid license. For checking the license data L, the sensor 1 checks e.g. whether the individual identifier K of the flash card 10 corresponds with the identifier K for which the license data L are valid. In the example of FIG. 2c, the identifier K of the flash card 10 is also contained in the license data L (cf. FIGS. 2c, 2d), and it is checked whether the identifier K of the license data L matches the identifier K of the flash card 10. Instead of a match, another kind of corresponding of the two identifiers can also be checked, e.g. whether the two identifiers yield a certain result when combined mathematically with each other. The license data L from FIG. 2c can be employed only in connection with the flash card 10, because the latter has the right identifier K. If the license data L are copied onto another flash card carrying an identifier K' different from K, the check of the license data L by the sensor 1 yields a negative result and the loading of the software and adaptation data into the sensor 1 is refused.

Figure 2D:
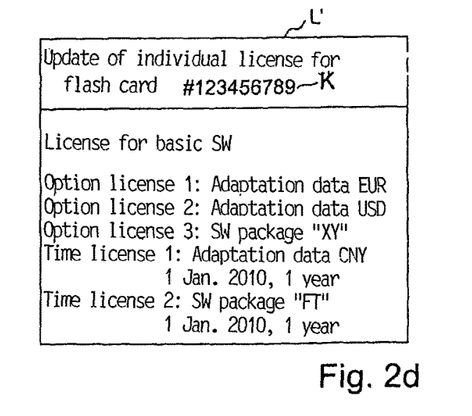

If the sensor operator wishes to acquire additional licenses, update license data L' are made available to him, cf. FIG. 2d. The update license data L' are stored on the flash card 10 and replace or supplement the (previous) license data L there. The license data L' can be sent to the sensor operator e.g. electronically, e.g. by email, without being made available to him for downloading from the Internet. In the example of FIG. 2d, the sensor operator receives update license data L' which comprise additionally, in comparison to the (previous) license data L, two time licenses which are only valid for a limited time: the time license 1 for the data set "CNY" of the adaptation data A, and the time license 2 for the software option "FT". The two time licenses 1 and 2 allow the loading of those data sets "CNY" and of that software option "FT" that are dated with a date from 1 Jan. 2010 to 31 Dec. 2010, cf. FIGS. 2a, 2b. A data set "CNY" or software option "FT" dated after this time will no longer be enabled with these time licenses 1 and 2. However, a data set "CNY" dated with a date from 2010 and such a software option "FT" still remain employable.

Figure 2E:
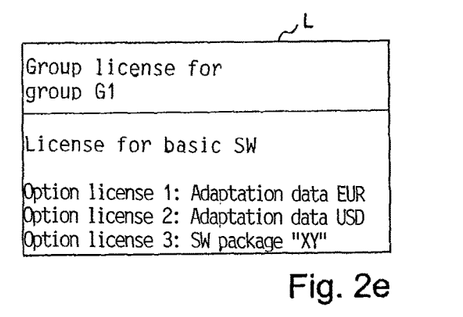

FIG. 2e shows an alternative embodiment example for the license data L which are not compiled individually for an individual flash card 10, but for a group G1 of flash cards. The group G1 includes e.g. several flash cards of the same user. The license data L shown in FIG. 2e contain a group license which allows the use of the basic software, the software "XY" and adaptation data EUR, USD for all flash cards belonging to the group G1. For an individual flash card 10 belonging to the group G1 the license data from FIG. 2e compiled for the group G1 hence have the same function as the individually compiled license data L from FIG. 2c. The group license has the advantage that the license data L need no longer be compiled and delivered differently for each flash card individually. While, with individual license data, each flash card must always have certain license data L stored thereon, each flash card of the group G1 can instead receive the group license compiled for the group G1. For users wishing to provide a very great number of flash cards with the same licenses, this considerably reduces the file handling effort.

Figure 2F:
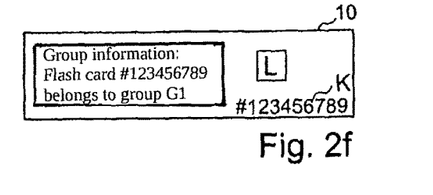

FIG. 2f shows a flash card 10 on which the license data L from FIG. 2e containing the group license are stored. To achieve that the group license is employable only for the flash cards of the group G1, those flash cards belonging to a group receive a group information item which is stored on the respective flash card so as to be cryptologically safeguarded against falsification, cf. FIG. 2f. The group information item contains an association of the flash card with one or with several groups. In the example of the flash card 10 from FIG. 2f, the group information item consists of the information that the flash card having the identifier K belongs to the group G1. The group information item is different for each flash card individually, because it refers to the respective individual identifier of the flash card. For example, the group information item is already stored on the flash card 10 before the delivery of the flash card 10 to the user.

Before the loading of the adaptation data A and of the software SW, the sensor 1 checks whether the license data L of the flash card 10 connected to the sensor 1 are valid. If the sensor finds the license data L from FIG. 2e, it first ascertains that the license data L are a group license for the group G1. Thereupon the sensor 1 checks whether the flash card 10 connected thereto also contains group information about the group G1 and whether this group information indicates the association of the flash card 10 having the identifier K with the group G1 stated in the license data. Because the respective individual identifier as well as the respective group information item are stored unchangeably on the respective flash card, the group license can be employed only with those flash cards containing the appropriate group information item for the respective identifier of the respective flash card. The license data L containing a group license can hence also be sent to the users simply over the Internet.

The invention claimed is:

1. A sensor for checking value documents, comprising:
  a non-volatile memory which is installed permanently in the sensor and in which firmware is contained, but in which neither adaptation data for checking the value documents nor software for checking the value documents is stored,
  a measuring device arranged to collect measuring data of the value documents,
  a processor configured to control the sensor,
  said sensor having a communication interface in which data can be loaded into the sensor from a computer outside the sensor, the computer being the computer of an apparatus in which the sensor is installed, said sensor being provided with adaptation data to check the value documents and software for checking the value documents to be loaded into the sensor from the computer of the apparatus via the communication interface, wherein both said adaption data and software are temporarily stored in a volatile memory of the sensor, and
  wherein neither the adaptation data loaded into the sensor nor the software loaded into the sensor is stored in the sensor permanently,
  wherein both the adaptation data and software are loaded from the computer of the apparatus into the volatile memory of the sensor only when the sensor is operated for checking the value documents.

2. The sensor according to claim 1, wherein the sensor is arranged to be employable for checking the value documents only when the computer is connected to the sensor via the communication interface.

3. The sensor according to claim 1, wherein the sensor is arranged to check, before a loading of either or both the software and the adaptation data into the sensor, for which software and/or adaptation data computer connected to the communications interface supplies a valid license.

4. An apparatus for checking value documents, comprising the sensor recited in claim 1, and the computer which is connectable or connected to the sensor via the communications interface.

5. The apparatus according to claim 4, wherein the computer has license data stored thereon through which it is determined for which software and/or for which adaptation data the computer supplies a license.

6. The apparatus according to claim 4, wherein the computer has an individual identifier which is stored unchangeably on the computer, and the license supplied by the computer is coupled to the individual identifier of the computer.

7. The sensor of claim 1, wherein the sensor is connected to a computer via a data line, and wherein one or more of software updates and adaptation data updates and license data updates are transferred to the sensor by the computer via the data line.

8. The sensor of claim 7, wherein the one or more of software updates and adaptation data updates and license data updates are transferred over the Internet to the computer and through the data line to the sensor.

9. The sensor of claim 8, wherein loading of the one or more of software updates and adaptation data updates and license data updates depends on whether a data carrier connected to the sensor supplies a valid license for the one or more of software updates and adaptation data updates and license data updates to the computer.

10. The sensor of claim 7, wherein the one or more of software updates and adaptation data updates and license data updates are stored on a flash card connected to the sensor and not stored on the sensor, and wherein the one or more of software updates and adaptation data updates and license data replace or supplement one or more of previously stored software, adaptation data, and license data on the flash card.

11. The sensor of claim 1, wherein the one or more of software updates and adaptation data updates are transferred from the Internet to the computer.

12. The sensor of claim 1, wherein license data updates are sent via the communication interface through the sensor to a flash card connected to the sensor, and wherein the license data updates replace or supplement previous license data on the flash card.

13. The sensor according to claim 1, wherein both the adaptation data and the software are stored permanently in a memory area of the computer of the apparatus in which the sensor is installed and transferred from the memory area of the computer to the sensor via a data line when it is time to check the value documents.

14. The sensor according to claim 1, wherein the sensor is connected to the computer by a data line via which software and adaption data are transferred from the memory area of the computer of the apparatus to the sensor and the sensor is connected to the computer of the apparatus additionally by a real-time connection.

15. The sensor according to claim 14, wherein the real-time connection is a bi-directional real-time connection via which control commands or measurement results of the sensor are transferred from or to the computer.

16. A method for operating a sensor which is used to check value documents, the sensor having:
a non-volatile memory which is installed in the sensor permanently and in which firmware is contained, but in which neither adaptation data for checking the value documents nor software for checking the value documents is stored,
a measuring device arranged to collect measuring data of the value documents,
a processor that controls the sensor,
a communication interface via which data can be loaded into the sensor from a computer outside the sensor, the computer being the computer of an apparatus in which the sensor is installed, comprising the steps:
a) connecting the computer to the sensor via the communication interface, and
b) loading both adaptation data for checking the value documents and software for checking the value documents into the sensor from the computer only when the sensor is operated for checking the value documents, and storing them both temporarily in a volatile memory of the sensor, wherein neither the adaptation data loaded into the sensor nor the software loaded into the sensor is stored in the sensor permanently.

17. The method according to claim 16, wherein the computer has license data stored thereon through which it is determined for which either or both software and adaptation data the computer supplies a license.

18. The method according to claim 17, wherein before the loading of the software and/or of the adaptation data into the sensor according to step b), a check is made on the basis of the license data stored on the computer for which software and/or adaptation data the data carrier supplies a valid license.

19. The method according to claim 18, wherein upon the checking for which either or both software and adaptation data the computer supplies a valid license, a check is made of whether an individual identifier unchangeably stored on the computer corresponds with the license data.

20. A sensor for checking value documents, comprising:
a non-volatile memory which is installed permanently in the sensor and in which firmware is contained,
a measuring device arranged to collect measuring data of the value documents,
a processor configured to control the sensor,
said sensor having a communication interface via which data can be loaded into the sensor from a computer outside the sensor, the computer being the computer of an apparatus in which the sensor is installed, said sensor being provided with either or both adaptation data to check the value documents and software for checking the value documents to be loaded into the sensor from the computer of the apparatus via the communication interface, wherein either or both said adaption data and software loaded into the sensor from the computer of the apparatus are temporarily stored in a volatile memory of the sensor but neither stored in said non-volatile memory of the sensor nor in another non-volatile memory of the sensor,
wherein either or both the adaption data and software are loaded from the computer of the apparatus into the volatile memory of the sensor not before the sensor is to be operated for checking the value documents.

21. The sensor according to claim 20, wherein the sensor is arranged to check, before a loading of either or both the software and the adaptation data into the sensor, for which software and/or adaptation data computer connected to the communications interface supplies a valid license.

22. The sensor of claim 20, wherein the one or more of software updates and adaptation data updates are transferred from the Internet to the computer.

23. The sensor according to claim 20, wherein both the adaptation data and the software are stored permanently in a memory area of the computer of the apparatus in which the sensor is installed and transferred from the memory area of the computer to the sensor via a data line when it is time to check the value documents.

24. The sensor according to claim 20, wherein the sensor is connected to the computer by a data line via which software and adaption data are transferred from the memory area of the computer of the apparatus to the sensor and the sensor is connected to the computer of the apparatus additionally by a real-time connection.

25. The sensor according to claim 24, wherein the real-time connection is a bi-directional real-time connection via which control commands or measurement results of the sensor are transferred from or to the computer.

* * * * *